Jan. 20, 1959
L. SKIPWITH, JR
2,869,582
SHUT-OFF VALVES
Filed July 26, 1954
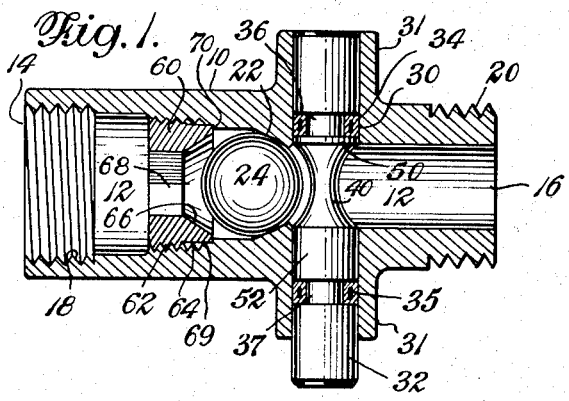
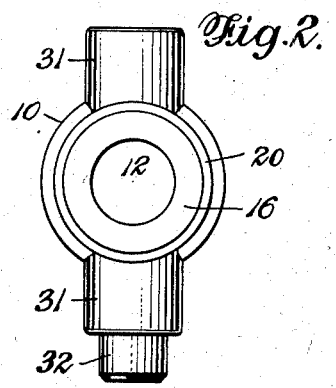
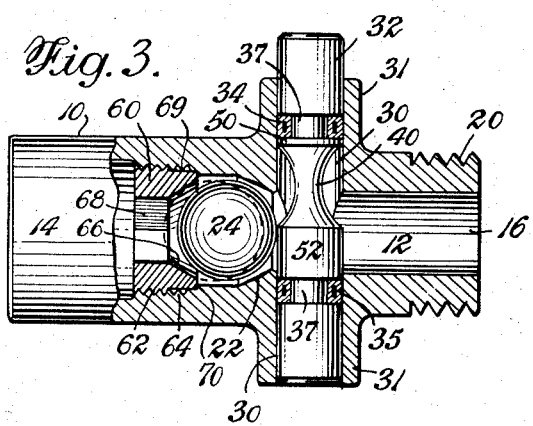
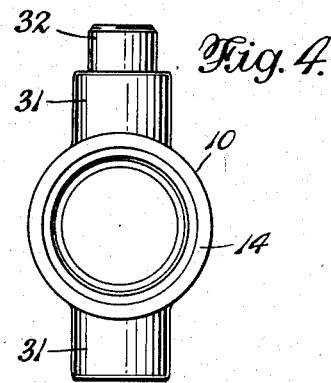
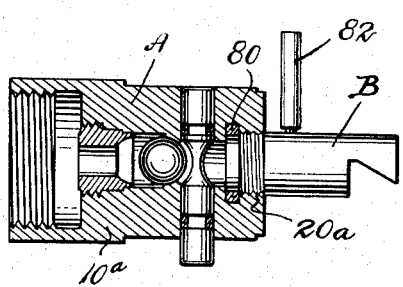
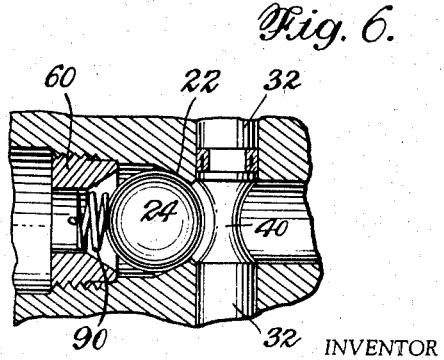
INVENTOR
Lee Skipwith, Jr
BY
ATTORNEY United States Patent Office 2,869,582
Patented Jan. 20, 1959

2,869,582

SHUT-OFF VALVES

Lee Skipwith, Jr., St. Petersburg, Fla., assignor to Sprayers & Nozzles, Inc., St. Petersburg, Fla., a corporation of Florida Application July 26, 1954, Serial No. 445,691

1 Claim. (Cl. 137—614.19)

The invention relates to improvements in shut-off valves, and more particularly to a valve comprising a ball adapted to be forced by the pressure of fluid against a tapered seat in the valve housing, which ball is adapted to be moved from its seat by means of a manually operable plunger or pin.

One of the distinctive features of the improved valve resides in the provision of means for preventing back siphonage at all times.

Another distinctive feature resides in the fact that after the plunger or pin has been actuated the valve remains open until the valve actuating plunger or pin is manually retracted.

A further distinctive feature of my improved device resides in the simplicity of construction as compared with shut-off valves of the prior art known to me.

The improved valve may be conveniently used in connection with a sprayer nozzle assembly of the general type disclosed in application Serial No. 395,926, filed December 3, 1953, now Pat. No. 2,767,022, though it will be understood that the present invention is in no way confined to such use, and the aforesaid nozzle assembly per se is not my invention.

The invention will be more readily understood by reference to the accompanying drawings and the following detailed description in which are set forth, by way of illustration rather than by way of limitation, specific embodiments of the invention.

In the drawings:

Fig. 1 is a longitudinal section of a shut-off valve embodying my invention, parts being shown in elevation, the valve being illustrated in the closed position;

Fig. 2 is an end view of the same;

Fig. 3 is a view similar to Fig. 1, the valve being shown open;

Fig. 4 is an end view of Fig. 3;

Fig. 5 is a view similar to Fig. 1 on a smaller scale and showing a modification, the valve being shown in association with the sprayer nozzle assembly of Serial No. 395,926; and Fig. 6 is a fragmentary sectional view similar to Fig. 1 but showing a modification in which a spring is employed in connection with the valve ball.

Referring first to the embodiment shown in Figs. 1 to 4, the reference numeral 10 denotes a valve housing which may be of any suitable material, as for example a brass casting. Passing longitudinally through the housing is a passage 12 leading from an inlet end 14 to an outlet end 16. The inlet and outlet ends may be threaded as indicated at 18 and 20 for attachment of suitable equipment in connection with which the shut-off valve is to be used. As shown, the inlet portion 14 is of larger diameter than the outlet portion 16.

The housing 10 is provided with a tapered seat 22 intermediate the inlet and outlet ends but facing the inlet end, against which seat a spherical ball 24 is adapted to be forced by fluid under pressure entering the housing from inlet 14, thereby preventing flow of fluid through the passage 12 to the outlet 16. The ball 24 is of such diameter as to fit the tapered seat 22 in the housing. The ball is preferably made of material either harder or softer than the material of the valve seat 22. Thus, if the seat is of cast brass the ball may be of nylon, or vice versa, thereby insuring a tight fit.

In accordance with my invention the housing 10 is provided with a transverse passage or bore 30 for receiving a manually operable valve actuating member in the form of a plunger or pin. The axis of the passage 30 is at right angles to the axis of the fluid passage 12. The transverse passage 30 is located immediately adjacent the valve seat 22 and extends through lateral bosses 31, 31 of the valve housing 10. Slidably mounted within the transverse passage 30 is a manually operable valve actuating cam plunger or valve operating pin 32 which may be of any suitable material, as for example brass, and is of a diameter slightly smaller than the diameter of the passage 30 and of a length somewhat greater than the passage so that at all times either one end or the other or portions of both will protrude beyond the end or ends of such passage. The cross passage 30 is sealed against leakage by the provision of sealing rings 34, 35 carried in annular grooves 36, 37 formed in the plunger. The sealing rings 34, 35 may be of rubber, either natural or synthetic, or of any other suitable material, and may be of any desired cross section, as for example O-rings. In addition to sealing the passage 30 against leakage the rings 34, 35 serve to frictionally hold the plunger in any desired position, as for example in fully open or fully closed position of the ball 24, or any intermediate positions.

For actuating the ball 24 the plunger 32 is provided with a reduced arcuate or spherically tapered portion 40 circular in cross section and adapted to serve as a cam when the plunger is actuated in either direction. As shown, the spherical portion 40 is closer to the sealing ring 34 and groove 36 than it is to the ring 35 and the groove 37, or in other words the extent of the uncut portion 50 of the plunger 32 intermediate the spherical portion 40 and groove 36 is less than the uncut portion 52 intermediate the end of the spherical portion 40 and the groove 37.

In order to prevent back siphonage of liquid regardless of the position of the plunger 32 and ball 24 I provide a bushing-like insert 60 externally threaded at 62 to fit internal threads 64 within the inlet portion of the valve housing. As shown, this insert is provided with a tapered seat portion 66 in the direction of the valve ball 24 and is provided with a broached hexagonal internal passage 68 facing the inlet 14 of the flow passage 12. Thus, if there should be a reverse flow of liquid such as is encountered in back siphonage of a water supply the ball 24 would be sucked backward and seat against the tapered seat 66, thereby preventing reverse flow of liquid through the valve.

As shown the insert 60 is provided with an undercut portion 69 beyond the threaded portion 62, and the end of this undercut portion is adapted to engage a shoulder 70 formed in the valve housing when the insert is fully seated. The hexagonal form of the longitudinal passage 68 is designed to permit ready assembly of the insert 60, but other forms may be used if desired.

The operation of the device will be readily apparent from the foregoing description but will be briefly summarized as follows:

The valve housing or body member 10 may be connected at its inlet end 14 to a source of liquid under pressure, as for example to one end of a garden hose, and at the other end 16 may be connected to a spray nozzle or the like. When the operating plunger 32 is in the position shown in Fig. 1 it will be apparent that fluid under pressure entering the valve assembly at 14 will immediately force the valve ball 24 against its tapered seat 22, thus preventing passage of liquid through the outlet end. To open the valve the plunger 32 is manually operated to the position indicated in Fig. 3, thereby forcing the valve ball 24 rearwardly from its seat and allowing fluid to flow past the valve ball 24 and the reduced portion 40 of the plunger and thence through the outlet end 16 to a spray nozzle or other equipment, if any, which may be connected to such outlet end. The rings 34 and 35 serve to seal the transverse passage 30, preventing fluid from escaping through the ends thereof and at the same time, by reason of the tight fit between the sealing rings and the internal walls of the bosses 31, holding the plunger and valve ball 24 in adjusted position until the plunger is manually returned to the position of Fig. 1. Obviously, if there should be a reverse flow of liquid, such as is encountered in back siphonage of a water supply, the valve ball 24 would be sucked backward and sealed against the tapered seat 66 of the insert 60, thus preventing back siphonage of liquid through the shut-off valve. Such sealing against back pressure can take place regardless of the position of the cam plunger. The prevention of back siphonage is particularly important since there are certain localities in the United States, as for example New York city and Los Angeles, where all devices to be attached to the city water supply must have an automatic safety device to prevent back siphonage into the city mains.

In Fig. 5 a shut-off valve of the type described above is indicated at A and is shown in connection with a sprayer nozzle assembly B of the type disclosed in application Serial No. 395,926. In this figure the valve housing 10a of the shut-off valve, while essentially the same as that shown in Figs. 1 to 4, is herein shown as provided with an internally threaded outlet portion 20a to fit external threads of the valve nozzle assembly B, and in addition a sealing ring 80 is provided in the outlet portion to insure a tight fit with the nozzle assembly. Chemicals from an external source may be supplied to the sprayer nozzle B through a lateral connection 82.

In Fig. 6 the parts are also substantially the same as in Figs. 1 to 4 except that the valve ball 24 is provided with a compression spring 90 connected at one end to the interior of the insert 60 and engaging the valve ball at its other end. Such spring serves to positively retain the valve ball against the tapered seat 22 in the valve housing except when the plunger 34 is actuated. This arrangement is of advantage when the shut-off valve is used in systems which build up pressure very slowly and where the flow of liquid or air from the inlet end might not be sufficient to firmly seat the valve ball during the pressure build-up period. An application of this sort would be in connection with compressed air spraying equipment where the pressure is built up by hand.

The invention has been described in detail for the purpose of illustration but it will be obvious that numerous modifications and variations may be resorted to without departing from the spirit of the invention.

I claim:

A shut-off valve assembly comprising a valve housing provided with a longitudinal fluid passage having inlet and outlet ends, a first valve seat provided intermediate the ends of said passage and facing the inlet end thereof, a bushing-like insert provided in the inlet end portion of the passage in spaced relation from said first valve seat, a second valve seat provided in said insert and facing the first valve seat, a valve ball movably positioned in said passage between the first and second valve seats and selectively engageable therewith under pressure of fluid in said passage whereby to prevent fluid flow selectively in opposite directions, said housing being provided with a transverse bore intersecting the outlet end portion of said passage adjacent the first valve seat, and a cylindrical plunger reciprocable in said bore and projectable selectively at opposite ends therefrom whereby the plunger may be manually slid between closed valve and open valve positions, an intermediate portion of said plunger being annularly recessed and providing a concave cam member substantially complemental to the surface of said valve ball, the recessed portion of said plunger affording clearance for said valve ball to permit engagement of the valve ball within the first valve seat when the plunger is in the closed valve position, and said cam member being engageable with the valve ball to disengage the latter from the first valve seat when the plunger is slid to the open valve position, said plunger being formed with annular grooves adjacent opposite ends of said cam member, and sealing rings mounted in said grooves, said sealing rings frictionally engaging the wall of said bore and constituting means for frictionally retaining the plunger in a pre-selected position.

References Cited in the file of this patent

UNITED STATES PATENTS

| | | |
|---|---|---|
| 1,177,831 | Taylor | Apr. 4, 1916 |
| 1,819,452 | Wright | Aug. 18, 1931 |
| 1,855,106 | Gonyk | Apr. 19, 1932 |
| 1,915,553 | Shindel | June 27, 1933 |
| 2,139,926 | Byars | Dec. 13, 1938 |
| 2,373,294 | Cornelius | Apr. 10, 1945 |
| 2,484,628 | LeValley | Oct. 11, 1949 |
| 2,598,417 | Niemann | May 27, 1952 |
| 2,608,412 | Bletcher | Aug. 26, 1952 |
| 2,701,119 | Smith | Feb. 1, 1955 |

FOREIGN PATENTS

| | | |
|---|---|---|
| 443,440 | Great Britain | of 1936 |